(12) United States Patent
Florin

(10) Patent No.: US 7,114,400 B2
(45) Date of Patent: Oct. 3, 2006

(54) MAGNETOINDUCTIVE FLOWMETER AND METHOD FOR OPERATING A MAGNETOINDUCTIVE FLOWMETER

(75) Inventor: Wilhelm Florin, Duisburg (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 11/098,309

(22) Filed: Apr. 4, 2005

(65) Prior Publication Data

US 2005/0223815 A1 Oct. 13, 2005

(30) Foreign Application Priority Data

Apr. 8, 2004 (DE) ...................... 10 2004 018 078

(51) Int. Cl.
*G01F 1/58* (2006.01)
(52) U.S. Cl. .................................. 73/861.12
(58) Field of Classification Search ............ 73/861.08, 73/861.12, 861.17, 861.16
See application file for complete search history.

(56) References Cited

U.S. PATENT DOCUMENTS 4,972,722 A 11/1990 Hansen et al.
5,090,250 A * 2/1992 Wada ....................... 73/861.12
5,325,728 A * 7/1994 Zimmerman et al. ..... 73/861.12

FOREIGN PATENT DOCUMENTS

DE 3303017 7/1984

* cited by examiner

*Primary Examiner*—Jewel V. Thompson
(74) *Attorney, Agent, or Firm*—Cesari and McKenna, LLP; John F. McKenna

(57) ABSTRACT

A magnetoinductive flowmeter incorporates a magnet for generating a magnetic field that permeates the flowmeter's measuring tube with a magnetic field component perpendicular to the direction of flow, a first electrode and a second electrode which collect a voltage induced in the medium, and an amplifier to which the voltage collected by the electrodes is fed. A test voltage source and a comparator are provided, the test voltage source generating a test voltage, which is applied to the amplifier in a manner whereby the test voltage is superimposed over the voltage collected by the electrodes. The comparator is connected to the amplifier so that the output voltage of the amplifier can be fed to the comparator, and the comparator is designed in a manner whereby the output voltage of the amplifier can be compared with a reference value. This configuration permits easy calibration of the magnetoinductive flowmeter while during operation, any deviation from a calibrated condition can be detected reliably. A method for operating the flowmeter is also disclosed.

3 Claims, 2 Drawing Sheets

MAGNETOINDUCTIVE FLOWMETER AND METHOD FOR OPERATING A MAGNETOINDUCTIVE FLOWMETER

BACKGROUND OF THE INVENTION

1. Field of the Invention

This invention relates to a magnetoinductive flowmeter serving to measure the volume flow of a medium traveling through a measuring tube and incorporating a magnet for generating a magnetic field that permeates the measuring tube with a magnetic-field component perpendicular to the direction of flow, a first electrode and a second electrode for collecting a voltage induced in the medium, and an amplifier to which the voltage collected by the electrodes is fed. The invention also relates to a method for operating a magnetoinductive flowmeter serving to measure the volume flow of a medium traveling through a measuring tube and incorporating a magnet for generating a magnetic field that permeates the measuring tube with a magnetic-field component perpendicular to the direction of flow, a first electrode and a second electrode for collecting a voltage induced in the medium, and an amplifier to which the voltage collected by the electrodes is fed.

2. The Prior Art

Magnetoinductive flowmeters and methods for operating magnetoinductive flowmeters of the type referred to have been well known for some time and have been employed in a variety of different fields of application. The underlying concept of a magnetoinductive flowmeter for measuring the volume flow of a medium traveling through a measuring tube goes all the way back to Faraday who in 1832 proposed applying the principle of electrodynamic induction for measuring flow rates.

According to Faraday's Law of Induction, a medium that contains charge carriers and flows through a magnetic field will produce an electric field intensity perpendicular to the direction of flow and perpendicular to the magnetic field. A magnetoinductive flowmeter employs Faraday's Law of Induction whereby a magnet, generally consisting of two magnetic poles, each with a field coil, generates a magnetic field that contains a magnetic field component perpendicular to the direction of flow in the measuring tube. Within that magnetic field, each volume element of the medium flowing through the magnetic field and containing a certain number of charge carriers, will contribute the field intensity generated in the volume element concerned to the voltage collected by way of the electrodes.

In conventional magnetoinductive flowmeters, the electrodes are designed either for conductive coupling with the flowing medium or for capacitive coupling with the flowing medium. As a salient feature of magnetoinductive flowmeters, the measured voltage is proportional to the flow rate of the medium averaged across the diameter of the measuring tube. In other words, the measured voltage is proportional to the volume flow.

In a practical flow-measuring operation, the magnetic field in a magnetoinductive flowmeter is generally reversed in an alternating time sequence. The prior art shows different approaches to do that. For example, magnetoinductive flow measuring can be performed by means of an alternating field, in which case the field coils of the magnet are typically connected directly to a sinusoidal 60 Hz A.C. line source. However, transformation-related noise or line interference potentials can easily compromise the flow-generated voltage between the measuring electrodes.

In recent times, magnetoinductive flowmeters have generally been operated with a switched constant field. To create a switched constant field, the field coils of the magnet are fed a current having essentially a square-wave pattern with periodic polarity switching. Also possible, however, is the use of a pulsating constant field that is produced by only periodically feeding to the field coils of the magnet a square-wave current having the same polarity. However, a method whereby the field current is periodically polarity-reversed, producing a periodically alternating magnetic field, is preferred because switching the polarity of the magnetic field suppresses interference potentials such as electrochemical noise.

The voltage between the measuring electrodes is proportional to the flow rate and is usually quite small, typically in the microvolt range. That voltage is measured at the highest possible resolution (approx. 100 mV), with the measuring frequency of the more common magnetoinductive flowmeters employing the switched constant-field principle being in the 1 to 100 Hz range.

In conventional magnetoinductive flowmeters, the voltage collected at the electrodes is generally fed to an amplifier before the amplified, flow rate-dependent voltage signal undergoes further processing. Frequently used amplifiers are of the differential amplifier type. The amplified voltage signal is typically evaluated by means of a microprocessor, meaning that, before the voltage signal is sent to the microprocessor, it requires analog-to-digital conversion by means of an analog-to-digital converter.

To permit and perform the calibration of a magnetoinductive flowmeter of the type described above, it is important for the amplification path, i.e. the path traveled by the voltage signal via the amplifier to the evaluation unit, to work reliably. At the very least, the system must alert the operator of the magnetoinductive flowmeter to any deviation from calibrated operation that necessitates recalibration.

SUMMARY OF THE INVENTION

It is, therefore, the objective of this invention to introduce a magnetoinductive flowmeter, and a method for operating a magnetoinductive flowmeter, designed to permit easy calibration and, during operation of the magnetoinductive flowmeter, the detection and indication of any deviation from the calibrated condition especially as a result of problems in the amplification path.

For such a magnetoinductive flowmeter, the stated objective is achieved in that a test voltage source and a comparator are provided, that the test voltage source generates a test voltage, that the test voltage source is connected to the amplifier in a way as to permit the test voltage to be fed to the amplifier and to be superimposed over the voltage collected by the electrodes, that the comparator is connected to the amplifier so as to allow the output voltage of the amplifier to be fed to the comparator, and that the comparator is so designed as to permit a comparison of the amplifier output voltage with a reference value.

A key concept of this invention thus provides for the amplification path, and in particular for the amplifier, to be monitored for its calibrated operation, in that the amplifier is fed a test voltage in correlation—assuming proper operation—with a known amplifier output voltage, so that a comparison of the amplifier output voltage with a reference value can indicate whether the magnetoinductive flowmeter and in particular its amplifier is working properly. The reference value is typically factory-set during pre-delivery calibration of the magnetoinductive flowmeter, and any deviation of the amplifier output voltage from the reference value upon injection of the test voltage will constitute an indication of faulty, uncalibrated operation of the magnetoinductive flowmeter.

In a preferred embodiment of the invention, an alarm emits a warning signal whenever the amplifier output voltage deviates from the reference value by more than a predefined amount, alerting the operator of the magnetoinductive flowmeter to the fact that the instrument may require recalibration.

As has been indicated above, a microprocessor may be provided for the evaluation and/or further processing of the voltage signal collected as a function of the flow rate.

In that case, a specific preferred embodiment of the invention provides for an analog/digital converter to be connected in line with the amplifier. As another preferred aspect, the test voltage source, the analog/digital converter and/or the amplifier are powered, individually and independent of one another, by separate power supplies. When the power supply that feeds the test voltage source is different from the power supply for the analog/digital converter and, respectively, for the amplifier, it will also be possible to detect and trace changes in the operation of the magnetoinductive flowmeter that are caused by the power supply of the analog/digital converter or amplifier, requiring recalibration of the instrument.

In terms of the above-described method for operating a magnetoinductive flowmeter, the method according to this invention by means of which the stated objective is achieved, is characterized in that a test voltage is generated and fed to the amplifier in a manner whereby said test voltage can be superimposed over the voltage collected by the electrodes, and that the output voltage of the amplifier is measured and compared with a reference value.

Corresponding to the above-described preferred embodiment of my magnetoinductive flowmeter, a preferred embodiment of the method according to this invention provides for an alarm signal to be generated when the amplifier output voltage deviates from the reference value by more than a predefined amount.

It is basically possible to employ the method according to this invention strictly during measuring intervals. In that case, the amplifier output voltage reflects the amplified test voltage only, and the method provides for verification of whether that voltage corresponds to the expected voltage or whether it deviates from the latter by more is than a predefined amount, indicating an out-of-calibration condition. However, in a preferred embodiment of the invention, the test voltage is generated and fed to the amplifier during the measuring operation and is superimposed over the voltage collected by the electrodes. Specifically, in a preferred embodiment of the invention, the test voltage is fed to the amplifier in temporary and preferably periodic fashion. Accordingly, this preferred embodiment of the invention provides for the test voltage to be superimposed over the voltage collected by the electrodes in intermittent fashion so that, in one phase the voltage signal emitted by the amplifier consists only of the amplified measured signal, while in the other phase a signal is emitted that is composed of the amplified measured signal and the superimposed, amplified test voltage.

Preferably in this context, a first voltage variable is determined in the form of the amplifier output voltage with no test voltage fed to the amplifier, a second voltage variable is determined in the form of the amplifier output voltage with the test voltage fed to the amplifier, a predefined voltage amount is subtracted from the second voltage variable and the resulting voltage potential is used as the reference value with which the first voltage variable is compared. Specifically, the predefined voltage amount subtracted from the second voltage variable should correspond to the amount expected for the amplified test signal.

As described further above, the method according to the invention, in a preferred embodiment of the invention, provides for the amplifier output voltage signal to be digitized by means of an analog/digital converter before it is compared with the reference value. In this connection, a preferred embodiment of the invention further provides for the test voltage to be generated independent of the supply voltage for the analog/digital converter and/or the supply voltage for the amplifier, to produce the above-referenced benefits.

There are numerous ways in which the magnetoinductive flowmeter according to this invention, and the method according to the invention for operating a magnetoinductive flowmeter, can be configured and further enhanced. In this connection, attention is invited to the dependent claims and to the drawings.

DETAILED DESCRIPTION OF AN ILLUSTRATIVE EMBODIMENT

Figure 1:
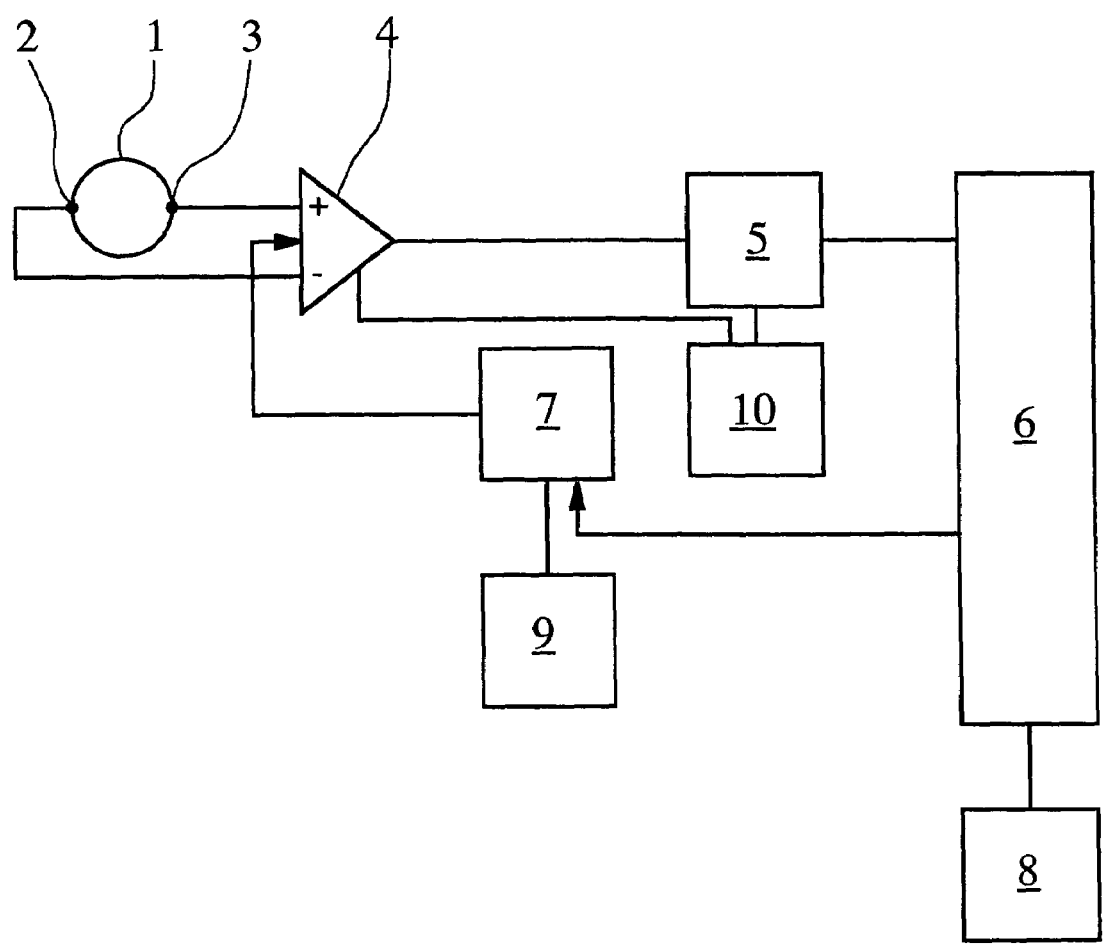
FIG. 1 is is a schematic illustration of a magnetoinductive flowmeter according to a preferred embodiment of the invention.

The schematic illustration in FIG. 1 shows a magnetoinductive flowmeter for measuring the volume flow of a medium traveling through a measuring tube 1. A magnet, not illustrated, serves to generate a magnetic field that permeates the measuring tube 1 with a magnetic field component extending perpendicular to the direction of flow. A first electrode 2 and a second electrode 3 collect the voltage induced by the magnetic field in the flowing medium. The voltage collected by the electrodes 2, 3 is fed to an amplifier 4.

Connected in line with the amplifier 4 is an analog/digital converter 5 which, on its part, connects to a comparator 6 in the form of a microprocessor that serves to evaluate the measured signal. The magnetoinductive flowmeter according to the preferred embodiment of the invention employs a switched constant field, meaning that the field coils of the magnet are fed a current essentially along a sequential square-wave pattern with periodically alternating polarity.

In addition to this configuration of the magnetoinductive flowmeter according to the preferred embodiment of the invention, which already permits operation of the magnetoinductive flowmeter, a test voltage source 7 is now provided. Activated by the comparator-microprocessor 6, the test voltage source 7 generates a test voltage that is fed to the amplifier 4. The generation and feed-in of the test voltage takes place in periodically interrupted fashion, causing the output of the amplifier 4 to periodically alternate between a phase in which it purely represents the amplified measured signal, i.e. the voltage collected by the electrodes 2, 3, and a phase in which the test voltage is superimposed over the measured signal. Once digitized by the analog/digital converter, these signals undergo further processing in the comparator 6.

From the signal that is composed of the measured signal and the amplified test voltage, the comparator 6 subtracts a predefined amount that fairly corresponds to the expected amplified test voltage so that a comparison of that voltage component obtained by subtraction with the pure, amplified measured signal permits verification of the proper operation of the magnetoinductive flowmeter according to the preferred embodiment of the invention. For as long as these two values do not deviate from each other by more than a predefined maximum amount, proper calibrated operation of the magnetoinductive flowmeter can be assumed. However, if the deviation exceeds that predefined amount, an alarm unit 8, connected to the comparator 6, will emit a warning signal alerting the user of the magnetoinductive flowmeter to the fact that the instrument is out of calibration.

Preferably, the test voltage is always fed to the amplifier for half a cycle or a few cycles of the magnetic field at a time. The test voltage will be of an order of magnitude corresponding to the voltage collected by the electrodes 2, 3, i.e. in the microvolt range. It is basically possible to directly compare two voltage variables emanating from the amplifier 4, with or without a superimposed test voltage. Preferably, however, the respective signals are averaged in the comparator 6, whereupon the averaged values are compared.

As can be seen in FIG. 1, separate and mutually independent power supplies 9, 10 are provided for the test voltage source 7, the amplifier 4 and the analog/digital converter 5, respectively. This allows for the dependable detection even of those deviations from a calibrated operation that are attributable to the power supply of the amplifier 4 and/or of the analog/digital converter 5.

Figure 2:
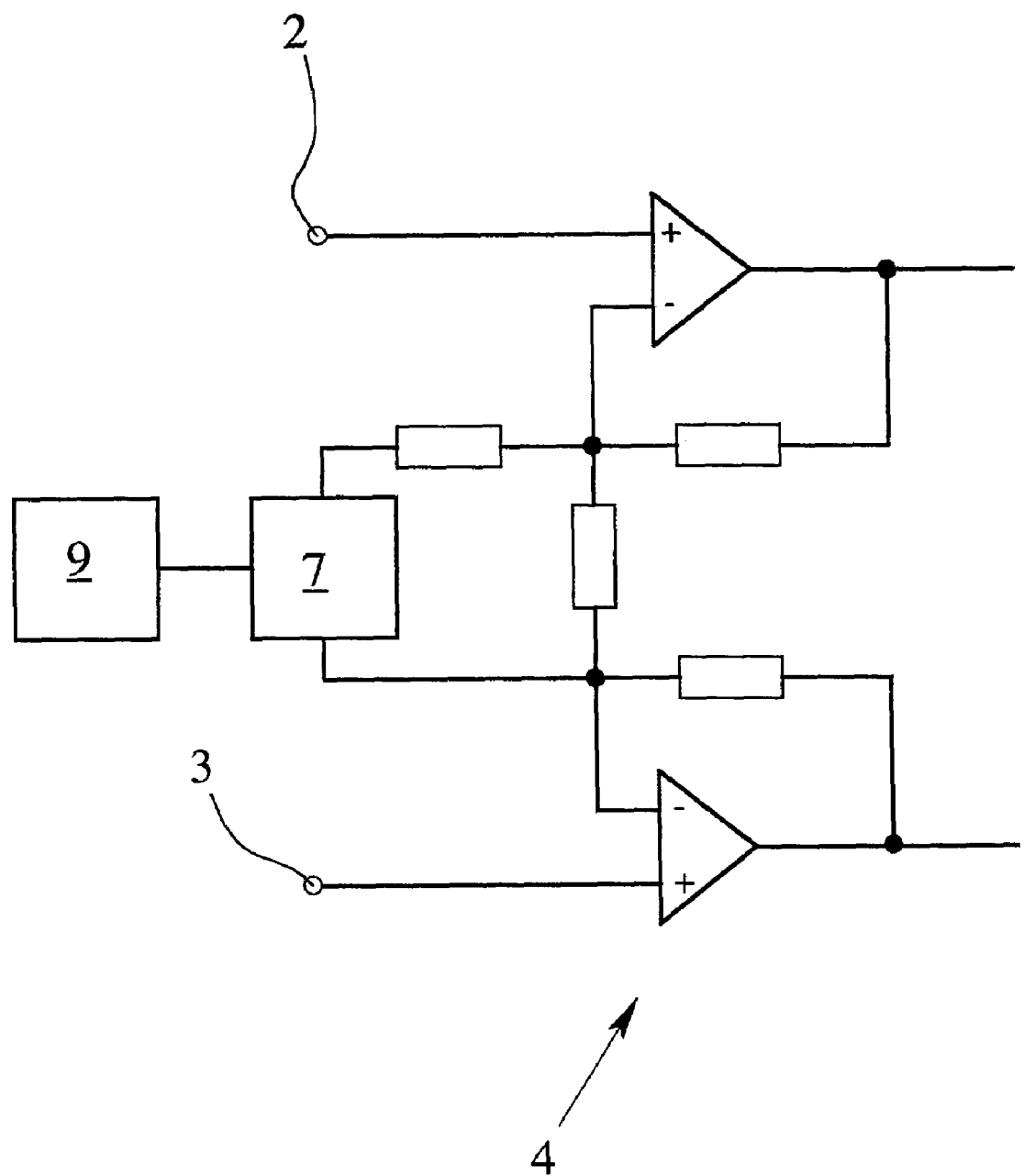
FIG. 2 shows in detail the amplifier circuit diagram of the magnetoinductive flowmeter according to the preferred embodiment of the invention.

FIG. 2 shows one possible implementation of the amplifier 4 in FIG. 1. As will be evident from the circuitry shown, activation of the test voltage source generates a test voltage which is fed to the amplifier 4 in a manner whereby the test voltage is superimposed over the voltage collected by the electrodes 2, 3. By contrast, in the deactivated is state of the test voltage source 7 only the measured signal, i.e. strictly the voltage signal collected between the electrodes 2, 3, will be amplified and passed on. The power supply 9 of the test voltage source 7 is exclusively dedicated to supplying power to the test voltage source 7 and is specifically independent of other power supplies that power the devices in the amplification path.

What is claimed is:

1. A method for operating a magnetoinductive flowmeter designed to measure the volume flow of a medium traveling through a measuring tube, said magnetoinductive flowmeter incorporating a magnet, a first electrode, a second electrode and an amplifier, said magnet generating a magnetic field component perpendicular to the direction of flow, the first electrode and the second electrode collecting a voltage induced in the medium which is fed to the amplifier, wherein a test voltage is generated and fed to the amplifier in a manner whereby said test voltage can be superimposed over the voltage collected by the electrodes, the output voltage of the amplifier is measured and compared with a reference value, and the test voltage is generated and fed to the amplifier during the measuring operation and in temporary, preferably periodically interrupted, fashion.

2. A method for operating a magnetoinductive flowmeter designed to measure the volume flow of a medium traveling through a measuring tube, said magnetoinductive flowmeter incorporating a magnet, a first electrode, a second electrode and an amplifier, said magnet generating a magnetic field component perpendicular to the direction of flow, the first electrode and the second electrode collecting a voltage induced in the medium which is fed to the amplifier, wherein a test voltage is generated and fed to the amplifier in a manner whereby said test voltage can be superimposed over the voltage collected by the electrodes, the output voltage of the amplifier is measured and compared with a reference value, a warning signal is emitted when the output voltage of the amplifier deviates from the reference value by more than a predefined amount, and the test voltage is fed to the amplifier in temporary, preferably periodically interrupted, fashion.

3. The method as in claim 1 or 2 wherein, as a first voltage value, the output voltage of the amplifier is measured when no test voltage is being fed to the amplifier, as a second voltage value, the output voltage of the amplifier is measured when the amplifier has been fed the test voltage, a predefined voltage amount is subtracted from the second voltage value, and the resulting voltage value is used as the reference value with which the first voltage value is compared.

* * * * *